United States Patent
Kameda et al.

[11] Patent Number: 5,186,078
[45] Date of Patent: Feb. 16, 1993

[54] ENGINE UNIT

[75] Inventors: Osamu Kameda; Hitoshi Akutagawa; Sakumi Hasetoh; Junichi Okita; Ichiro Hirose, all of Hiroshima, Japan

[73] Assignee: Mazda Motor Corporation, Hiroshima, Japan

[21] Appl. No.: 851,823

[22] Filed: Mar. 16, 1992

[30] Foreign Application Priority Data

Mar. 19, 1991 [JP] Japan .................................. 3-55086
Mar. 25, 1991 [JP] Japan .................................. 3-60530

[51] Int. Cl.⁵ .............................................. F16H 57/02
[52] U.S. Cl. .............................. 74/606 R; 123/195 R; 475/206
[58] Field of Search ............ 74/606 R; 475/198, 206; 123/195 R, 59 R, 59 A, 59 B

[56] References Cited

U.S. PATENT DOCUMENTS

| | | | |
|---|---|---|---|
| 4,028,964 | 6/1977 | Jones | 74/606 R |
| 4,223,567 | 9/1980 | Onda | 74/606 R |
| 4,457,187 | 7/1984 | Tsuboi | 74/606 R |
| 4,821,826 | 4/1989 | Lings | 123/195 R X |
| 4,915,070 | 4/1990 | Okui | 123/196 R |
| 4,938,098 | 7/1990 | Sasaki et al. | 475/206 X |
| 5,078,105 | 1/1992 | Ito et al. | 123/195 R |

FOREIGN PATENT DOCUMENTS 48-22886  7/1973 Japan .
63-103735  5/1988 Japan .
1316560 12/1989 Japan .

Primary Examiner—Dirk Wright
Attorney, Agent, or Firm—Sixbey, Friedman, Leedom & Ferguson

[57] ABSTRACT

An engine unit includes an engine and a power train which are disposed in parallel to each other. The power train includes a transmission and a differential. The engine and the power train are housed in one engine housing formed of upper and lower parts which are mated with each other along respective mated surfaces. Upper halves of bearings for the crankshaft and upper halves of bearings for a rotational shaft of the power train are formed in the mating surface of the upper part of the engine housing and lower halves of bearings for the crankshaft and lower halves of bearings for said rotational shaft of the power train are formed in the mating surface of the lower part of the engine housing. The upper part of the engine housing is formed integrally with the cylinder block of the engine.

13 Claims, 13 Drawing Sheets

ENGINE UNIT

BACKGROUND OF THE INVENTION

1. Field of the Invention

This invention relates to an engine unit including an engine and a power train for transmitting the output power to the driving wheels.

2. Description of the Prior Art

In a vehicle, an engine is sometimes mounted sideways so that its crankshaft extends in the transverse direction of the vehicle body. In such a vehicle, a transmission is generally mounted on the rear or front side of the engine to extend in parallel to the crankshaft in order to reduce the overall length of the engine unit including the engine itself and the power train, and the engine output power is transmitted from the crankshaft to the transmission through suitable means such as a chain, gears and the like. (See U.S. Pat. No. 4,915,070, Japanese Unexamined Patent Publication Nos. 63(1988)-103735 and 1(1989)-316560 and the like.)

In order to compactly arranging the engine unit, it may be preferred that the engine body and the power train be supposed in an integral housing. However, such an attempt can encounter difficulties in machining and assembly of the parts depending on the arrangement of the bearings for the respective shafts.

That is, generally the housing of the engine body (in the cylinder block) is divided into upper and lower parts at a portion supporting the crankshaft and the bearings for supporting the crankshaft are formed in the mating surfaces of the upper and lower parts. However if the housing of the engine body is further divided at a portion supporting the transmission shaft and the bearings for supporting the transmission shaft are formed there, the number of the parts forming the engine housing increases, which is not preferable in view of machining and assembly of the parts. In order to incorporate the transmission shaft and the like without further dividing the engine housing, the transmission shaft must be inserted into the engine housing through an opening formed in the wall of the engine housing. The opening must be larger in diameter than the transmission shaft and the transmission shaft must be provided at its end with a journal portion which conforms to the opening in diameter, which adds to the weight of the shaft and gives rise to a problem in strength.

In Japanese Utility Model Publication No. 48(1973)-22886, there is disclosed a power train mechanism in which the casing for housing a transmission and a front differential is formed integrally with a crank case and the bearing portions for the crankshaft and the bearing portions for the transmission shaft or drive shafts for the front wheels are formed in the same mating surfaces at which the integrated casing is divided. This power train mechanism is disadvantageous in that the bearing portions must be large in thickness in order to ensure sufficient supporting rigidity.

SUMMARY OF THE INVENTION

In view of the foregoing observations and description, the primary object of the present invention is to provide an engine unit in which machining and assembly of the parts are facilitated without increasing the weight of the shafts and in which the shafts can be rigidly supported without increasing the thickness of the bearing portions.

The engine unit in accordance with the present invention comprises an engine and a power train which are disposed in parallel to each other. The power train includes a transmission and a differential. The engine and the power train are housed in one engine housing formed of upper and lower parts which are mated with each other along respective mated surfaces. Upper halves of bearings for the crankshaft and upper halves of bearings for a rotational shaft of the power train are formed in the mating surface of the upper part of the engine housing and lower halves of bearings for the crankshaft and lower halves of bearings for said rotational shaft of the power train are formed in the mating surface of the lower part of the engine housing. The upper part of the engine housing is formed integrally with the cylinder block of the engine.

By housing the engine and the power train in one engine housing, the engine unit can be compactly arranged. Further by forming the bearings for the crankshaft and the bearings for one rotational shaft of the power train, which may be the transmission shaft or the differential shaft, in the mating surfaces of the upper and lower parts of the engine housing, the number of the parts forming the engine housing can be reduced without increasing the weight of the shafts, whereby machining and assembly of the parts are facilitated. Further since the upper part of the engine housing is formed integrally with the cylinder block which is very rigid, the shafts can be rigidly supported without increasing the thickness of the bearing portions.

When the bearing portions for balancer shafts are formed in the mating surfaces in addition to the bearings described above, machining and assembly of the balancer shafts are also facilitated without increasing the weight thereof.

In the case of a four-wheel drive vehicle, it is preferred that also the power train system which transmits the output of the transmission to the propeller shaft for the rear wheels be housed in the integral engine housing together with the engine and the power train system for the front wheels and the bearing portions for the power train system for the rear wheels be formed in mating surfaces.

The mating surfaces for the power train system for the rear wheels may be the same as the mating surfaces for the crankshaft and the power train system for the front wheels or different therefrom.

DESCRIPTION OF THE PREFERRED EMBODIMENT

An engine unit in accordance with a first embodiment of the present invention which is applied to a front-engine front-drive vehicle will be described with reference to FIGS. 1 and 2, hereinbelow.

Figure 1:
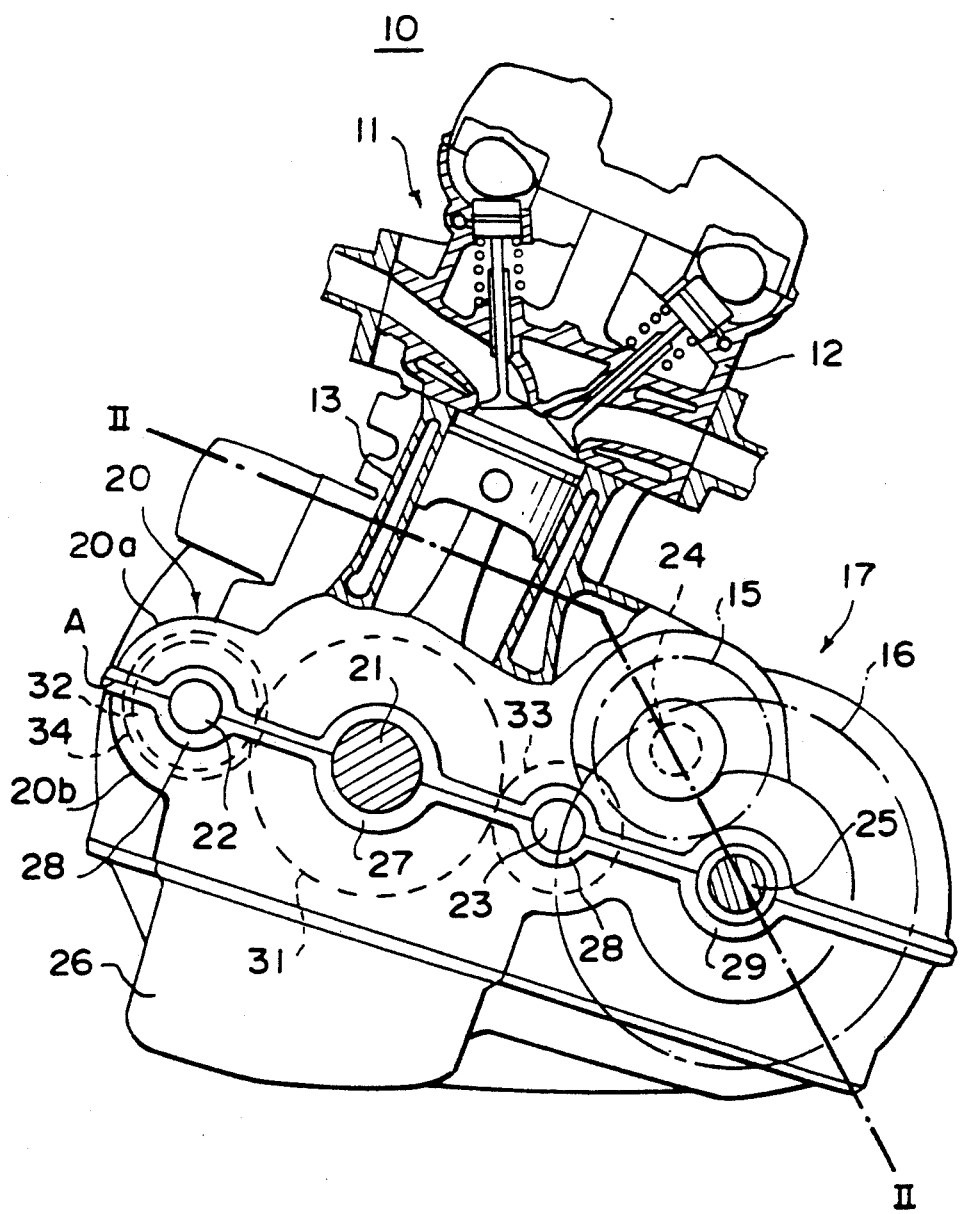
FIG. 1 is a side view partly in cross-section showing an engine unit in accordance with a first embodiment of the present invention.
Figure 2:
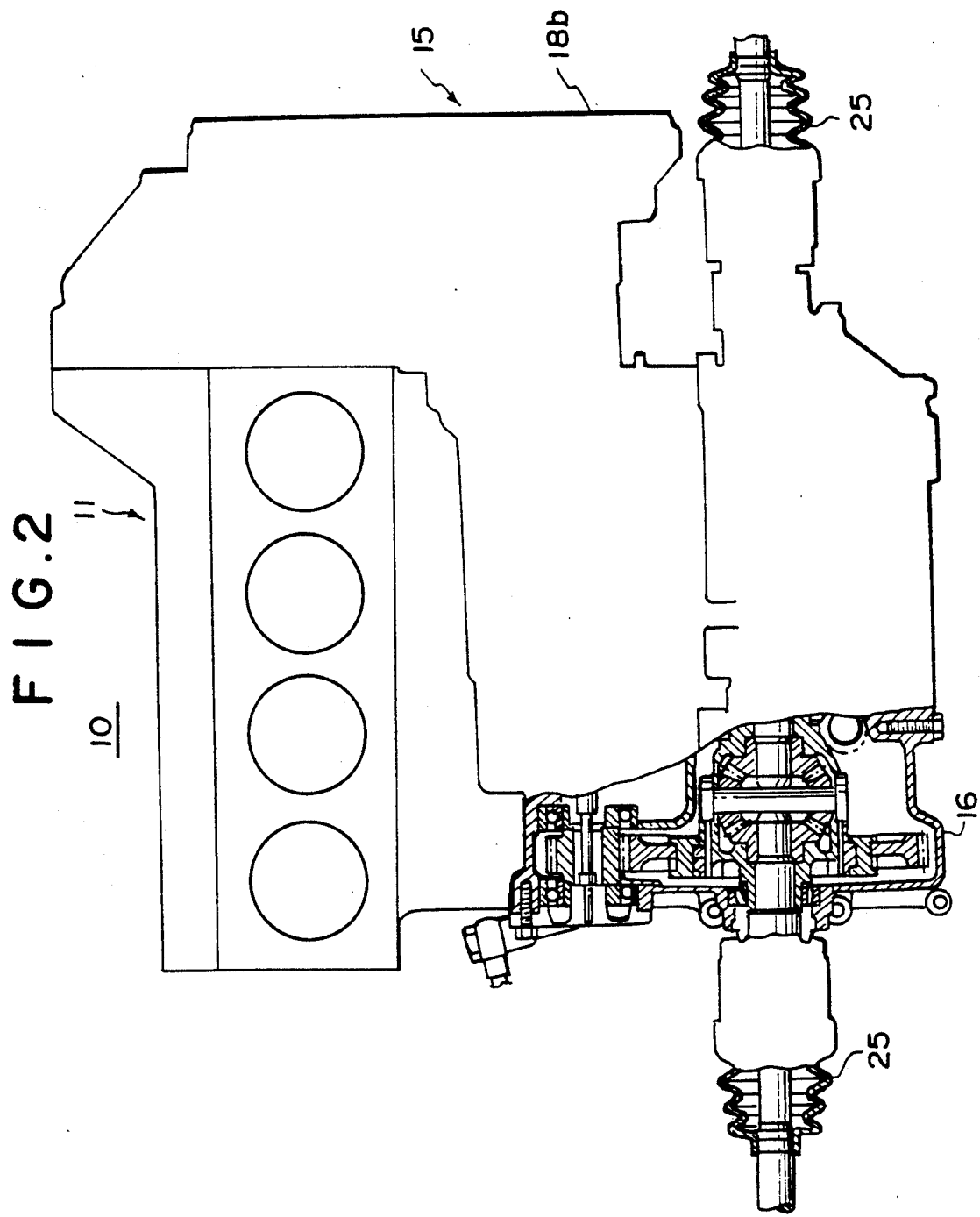
FIG. 2 is a cross-sectional view, partly abbreviated, taken along line IV—IV in FIG. 1.

In FIGS. 1 and 2, an engine unit 10 in accordance with the first embodiment of the present invention is mounted sideways in the front of a vehicle body (not shown) with the left side in FIG. 1 facing forward and drives the front wheels (not shown) of the vehicle. The engine unit 10 includes an engine 11 and a power train 17 which are housed in one engine housing 20. The engine 11 has a cylinder head 12 and a cylinder block 13. The power train 17 comprises a transmission 15 and a differential 16. The engine 11 has a crankshaft 21 extending in the transverse direction of the vehicle body and the upper portion of the engine 11 is slanted rearward of the vehicle body. A pair of balancer shafts 22 and 23 for suppressing vibration of the engine 11 are provided in the engine 11 spaced from each other in the longitudinal direction of the vehicle body with the crankshaft 21 intervening therebetween. A transmission shaft 24 and drive shafts (differential shafts) 25 which extend in opposite directions from the differential 16 are disposed in parallel to the crankshaft 21 on the rear side of the engine 11.

The engine housing 20 is formed of a main housing 20a and a lower housing 20b which are mated with each other along mating surfaces. A passing through the axis of the crankshaft 21. The main housing 20a is formed integrally with the cylinder block 13. An oil pan 26 is mounted on the lower side of the lower housing 20b. Bearing portions 27 for supporting the crankshaft 21 are formed in the mating surfaces A of the main housing 20a and the lower housing 20b. Bearing portions 28 for supporting the balancer shafts 22 and 23 are formed in the mating surfaces A of the main housing 20a and the lower housing 20b on opposite sides of the bearing portions 27. Further, bearing portions 29 for supporting the drive shafts 25 are formed in the mating surfaces A of the main housing 20a and the lower housing 20b on the rear side of the bearing portions 28 for the balancer shaft 23. The transmission shaft 24 of the transmission 15 is supported in the main housing 20a above the mating surfaces A.

Though not shown in detail, an output gear 31 provided on an intermediate portion of the crankshaft 21 is in mesh with small diameter gears 32 and 33 on the balancer shafts 22 and 23 to drive the balancer shafts 22 and 23. To an end portion of the forward balancer shaft 22 is fixed a gear 34 which is connected to a clutch (not shown), and the output of the clutch is transmitted to the transmission 15 and then to the front wheels through the differential 16 and the drive shafts 25.

With the arrangement described above, machining of the bearing portions 27 to 29 can be performed on the basis of one reference plane, and accordingly, control of accuracy of machining is facilitated and at the same time, assembly of the main housing 20a, the lower housing 20b and the shafts 21, 22, 23 and 25 is facilitated. Further, since the main housing 20a is integral with the cylinder block 13 which is very rigid, the shafts can be rigidly supported without increasing the thickness of the bearing portions.

Figure 3:
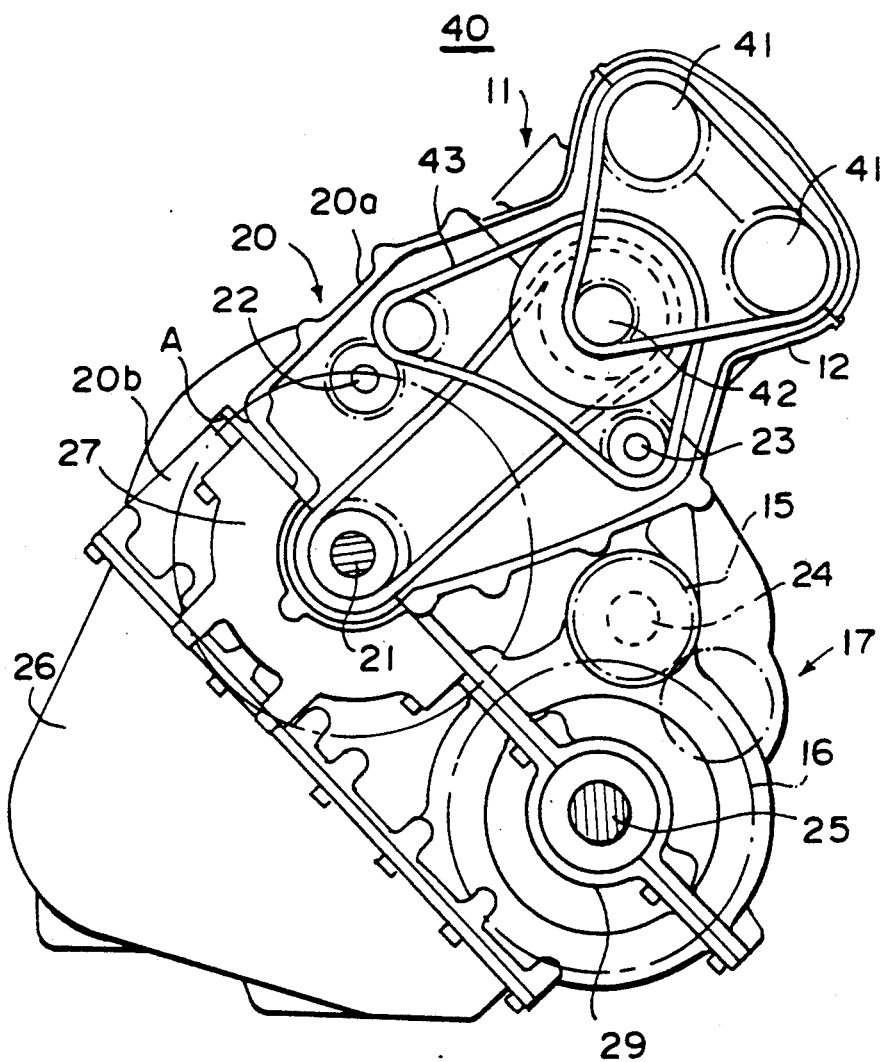
FIG. 3 is a side view partly in cross-section showing an engine unit in accordance with a second embodiment of the present invention.

An engine unit 40 in accordance with a second embodiment of the present invention shown in FIG. 3 differs from the engine unit 10 of the first embodiment in the arrangement of the balancer shafts 22 and 23. In FIG. 3, the parts analogous to those shown in FIGS. 1 and 2 are given the same reference numerals and will not be described here.

The engine 11 and the power train 17 are the same as those in the first embodiment in the basic structure and are housed in one engine housing 20. The cylinder head 12 is fixed to the top of the engine housing 20, and the transmission shaft 24 and the drive shafts 25 are disposed in the engine housing 20 in parallel to the crankshaft 21. The engine housing 20 is formed of the main housing 20a and the lower housing 20b which are mated with each other along the mating surfaces A passing through the bearing portions 27 for the crankshaft 21. The bearing portions 29 for the drive shafts 25 are formed in the mating surfaces A as in the first embodiment but the balancer shafts 22 and 23 are not disposed in the mating surfaces A in this embodiment.

In this embodiment, the balancer shafts 22 and 23 are supported on the main housing 20a above the crankshaft 21 spaced from each other in the longitudinal direction of the vehicle body. The balancer shafts 22 and 23 are driven, by way of a chain 43, by an intermediate shaft 42 which is driven by the crankshaft 21 and drives camshafts 41.

Though, in the first and second embodiments, the bearing portions 29 for the drive shafts 25 are formed in the mating surfaces A together with the bearing portions 27 for the crankshaft 21, other rotational shafts such as the transmission shaft 24 may be formed in the mating surfaces A in addition to or instead of the drive shafts 25.

An engine unit 100 in accordance with a third embodiment of the present invention which is applied to a four-wheel drive vehicle will be described with reference to FIGS. 4 to 6, hereinbelow.

Figure 4:
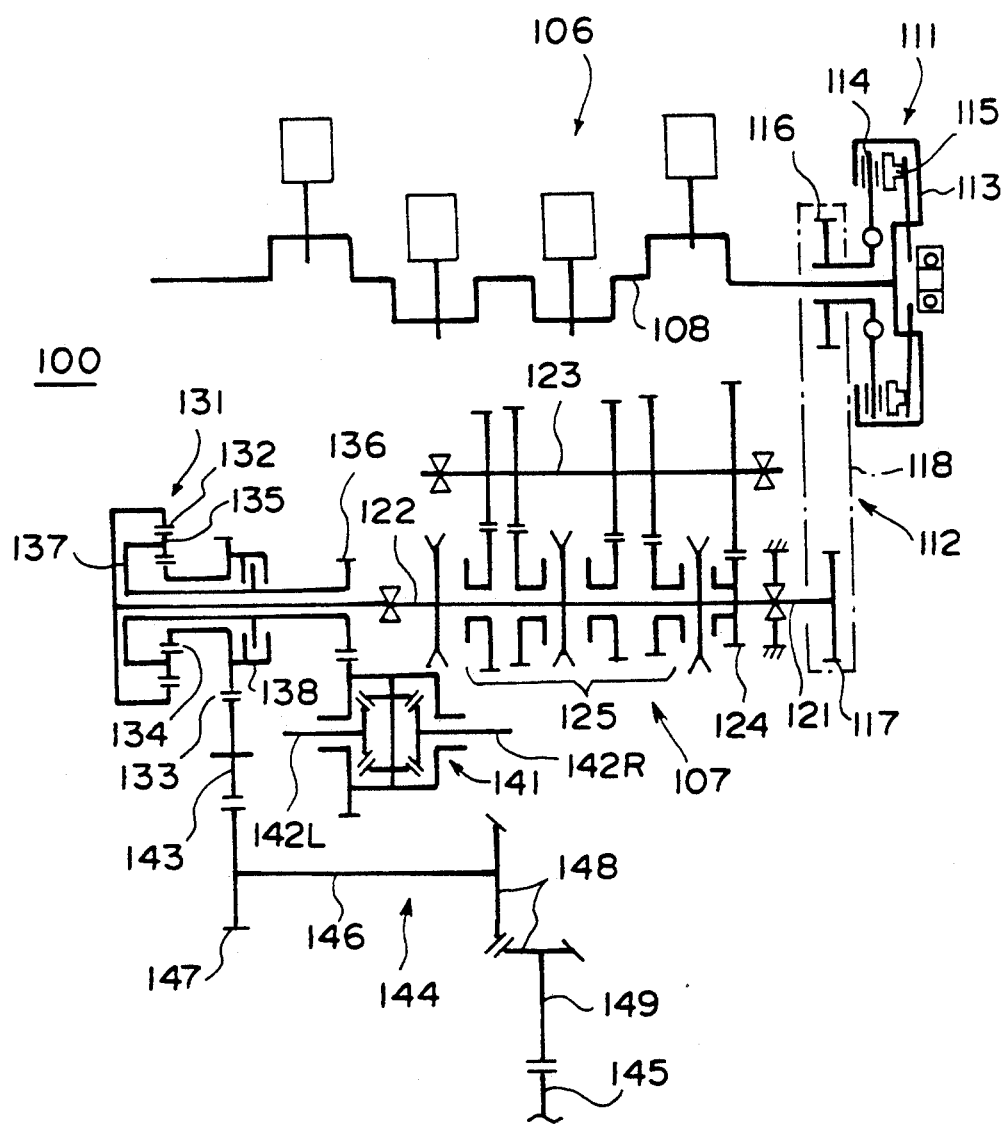
FIG. 4 is a schematic view showing the connection of the elements of an engine unit in accordance with a third embodiment of the present invention.
Figure 5:
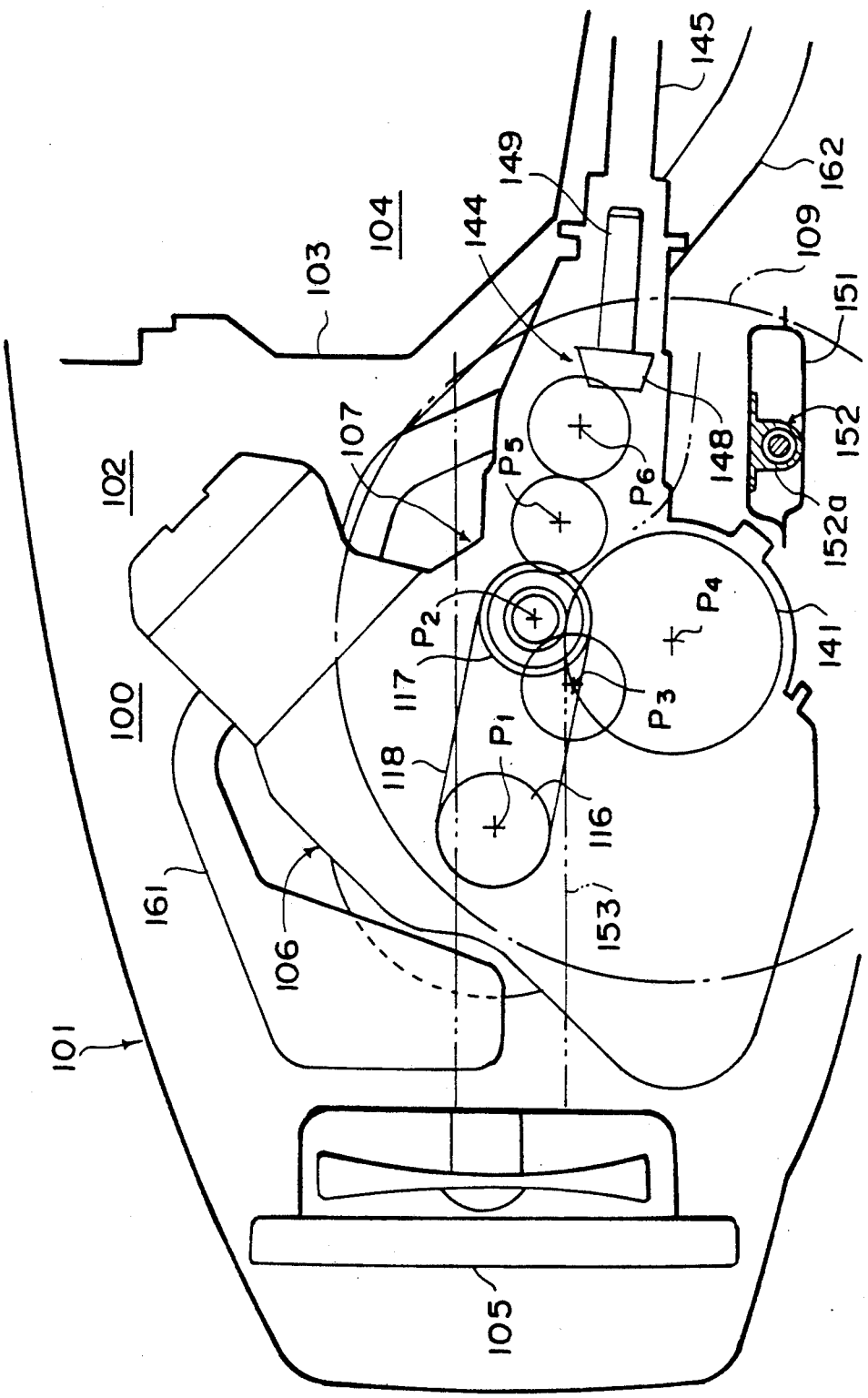
FIG. 5 is a schematic side view for illustrating the arrangement of the elements of the third embodiment.
Figure 6:
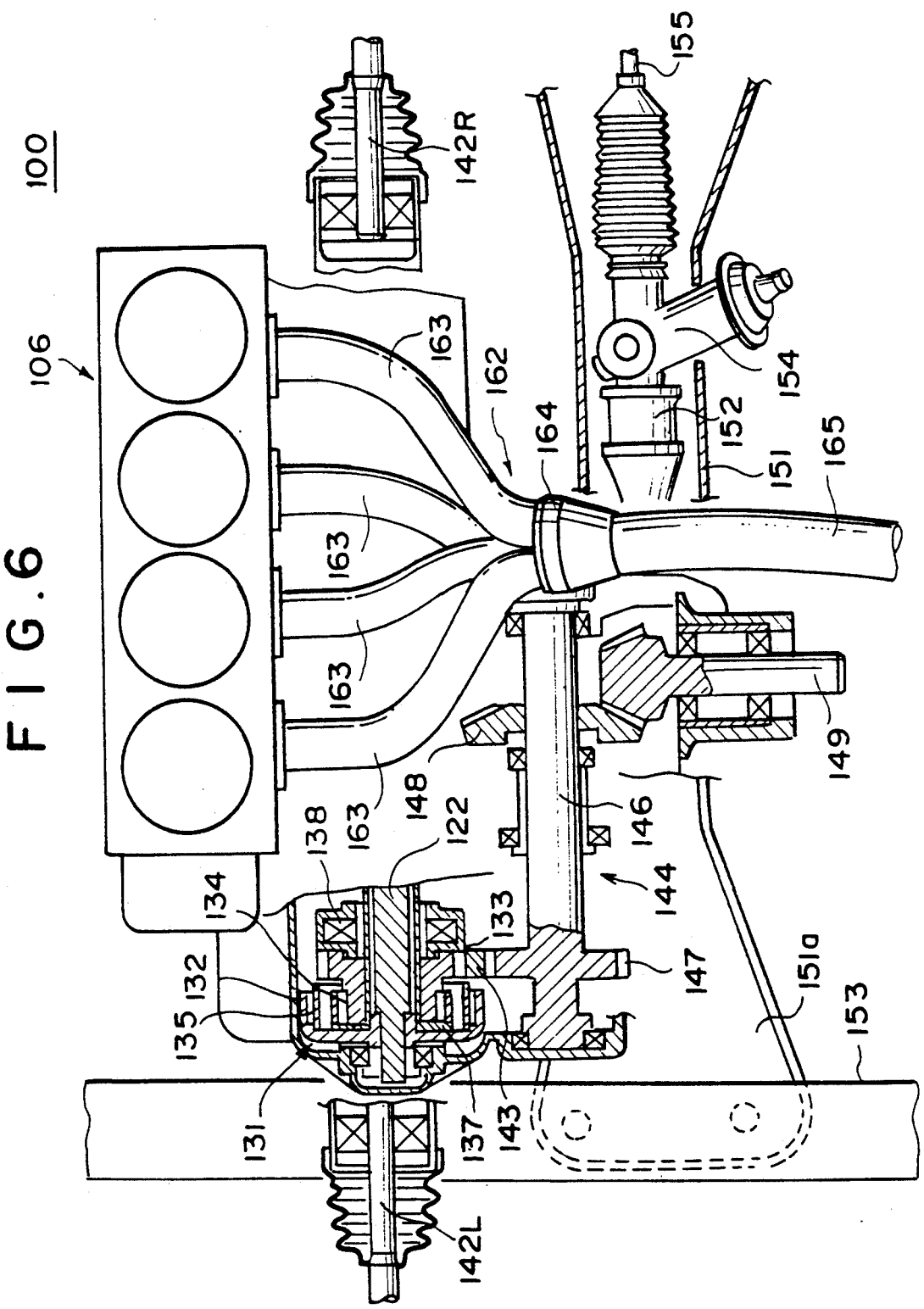
FIG. 6 is a plan view partly in cross-section for illustrating the arrangement of the elements of the third embodiment.

In FIGS. 4 to 6, an engine unit 100 of this embodiment is mounted in an engine room 102 formed in the front of a vehicle body 101. The engine room 102 is separated from a passenger room 104 by a dashboard panel 103. A radiator 105 is disposed in the front of the engine room 102 and the engine unit 100 is disposed on the rear of the radiator 105. The engine unit 100 includes a four-cylinder reciprocating engine 106 and a transmission 107. The engine 106 is mounted sideways with its crankshaft 108 directed in the transverse direction of the vehicle body 101, and the transmission 107 is mounted sideways on the rear side of the engine 106 in parallel to the crankshaft 108.

Reference numeral 111 denotes a clutch which is provided on one end portion of the crankshaft 108, and reference numeral 112 denotes a power transmission means which transmits the output of the clutch 111 to an input shaft 121 of the transmission 107. The clutch 111 comprises a support disk 113 which is connected to the crankshaft 108 to be rotated integrally therewith, a clutch disk 114 opposed to the support disk 113 and pressure plate 115 which presses the clutch disk 114 against the support disk 113. The power transmission means 112 comprises a drive sprocket 116 which is connected to the clutch disk 114 to be rotated integrally therewith, a driven sprocket 117 which is connected to the input shaft 121 of the transmission 107 to be rotated integrally therewith and a chain 118 passed around the sprockets 116 and 117. When the clutch 111 is engaged (i.e., when the clutch disk 114 is pressed against the support disk 113), the engine output power is transmitted to the input shaft 121 of the transmission 107 by way of the power transmission means 112.

The transmission 107 comprises the input shaft 121, an output shaft 122 which is in alignment with the input shaft 121 and a countershaft 123 which is in parallel to the input and output shafts 121 and 122. The input shaft 121 is drivingly connected to the countershaft 123 by way of a pair of reduction gears 124, and a transmission gear train 125 is interposed between the countershaft 123 and the output shaft 122. The engine output power transmitted to the input shaft 121 is further transmitted to the countershaft 123 through the reduction gears 124 and then to the output shaft through one of the transmission gear train 125.

A center differential 131 which distributes the engine output power output from the transmission 107 to the front and rear wheels is disposed on an extension of the axis of the output shaft 122. The center differential 131 is of a planetary gear type and comprises a ring gear 132 connected to the output shaft 122 of the transmission 107 to be rotated integrally therewith, a sun gear 134 which is coaxial with the ring gear 132 and is connected to a rear wheel side output gear 133 to rotate integrally therewith, a planetary gear 135 in mesh with both the ring gear 132 and the sun gear 134, and a carrier 137 which supports the planetary gear 135 and is connected to a front wheel side output gear 136 to rotate integrally therewith. A differential limiting mechanism 138 which is of a viscous coupling and limits rotation of the sun gear 134 and the carrier 137 relative to each other is disposed beside the center differential 131.

The driving force for the front wheels distributed by the center differential 131 is transmitted from the front wheel side output gear 136 to a front differential 141 which is of a bevel gear type, and then from the front differential 141 to the left and right front wheels 109 through left and right drive shafts 142L and 142R. The driving force for the rear wheels is transmitted to a rear differential (not shown) from the rear wheel side output gear 133 through an idle gear 143, a power transmission gear 144 and a propeller shaft 145. The power transmission gear 144 comprises a gear drive shaft 146 extending in the transverse direction of the vehicle body, a gear 147 which is fixed to an end of the gear drive shaft 146 and in mesh with the idle gear 143 and a pair of hypoid gears 148 which are respectively fixed to the other end of the gear drive shaft 146 and an end of a shaft 149 which is connected to the propeller shaft 145.

As shown in FIG. 5, the engine 106 is mounted sideways with its upper portion slanted by 45°. The central axis P2 of the input and output shafts 121 and 122 and the center differential 131 is positioned rearward of the central axis P1 of the crankshaft 108 of the engine 106. The central axis P3 of the countershaft 123 is positioned forward of and below the central axis P2. The central axis P4 of the front differential 141 and the drive shafts 142L and 142R for the front wheels 109 is positioned just below the axis P2. The central axis P5 of the idle gear 143 and the central axis P6 of the power transmission gear 144 (the gear drive shaft 146) are positioned rearward of the axis P2 on a line passing through the axis P2. The shaft 149 and the propeller shaft 145 extend rearward in alignment with each other slightly below the axis P6.

As shown in FIGS. 5 and 6, a cross member 151 of a closed cross-section extends in the transverse direction of the vehicle body on the rear side of the transmission 107 and the front differential 141, which are integrated together, close thereto. A steering rack 152 extends in the transverse direction of the vehicle body in the closed cross-section of the cross member 151, and a housing 152a of the steering rack 152 is fixed to the inner surface of the top wall of the cross member 151. The cross member 151 is bent upward at each end portion 151a and each end portion 151a is connected to a frame 53 which extends in the longitudinal direction of the vehicle body. The steering rack 152 is in mesh with a pinion 154 which is connected to a steering shaft so that the steering rack 152 is moved in the transverse direction of the vehicle body in response to turning of the steering wheel (not shown). Each end portion of the steering rack 152 projects outside the cross member 151 at each end portion of the cross member 151 and is connected to the front wheel by way of a tie rod 155. The cross member 151 and the steering rack 152 are positioned below the axis P4 of the drive shafts 142L and 142R and the front differential 141, and the axis P6 of the power transmission gear 144 and the hypoid gears 148 from which the driving force is transmitted to the propeller shaft 145 are positioned above the cross member 151.

Reference numeral 161 denotes an intake manifold and reference numeral 162 denotes an exhaust manifold. The exhaust manifold 162 comprises four first exhaust pipes 163 each connected to a cylinder and a second exhaust pipe 165 which is connected to the first exhaust pipes 163 by way of a collecting pipe 164. The first exhaust pipes 163 are substantially equal to each other in length and extend obliquely downward behind the transmission 107 from the upper portion of the engine 106, and is connected to the collecting pipe 165. The collecting pipe 165 extends rearward substantially at the middle between the left and right sides of the vehicle body.

Figure 7:
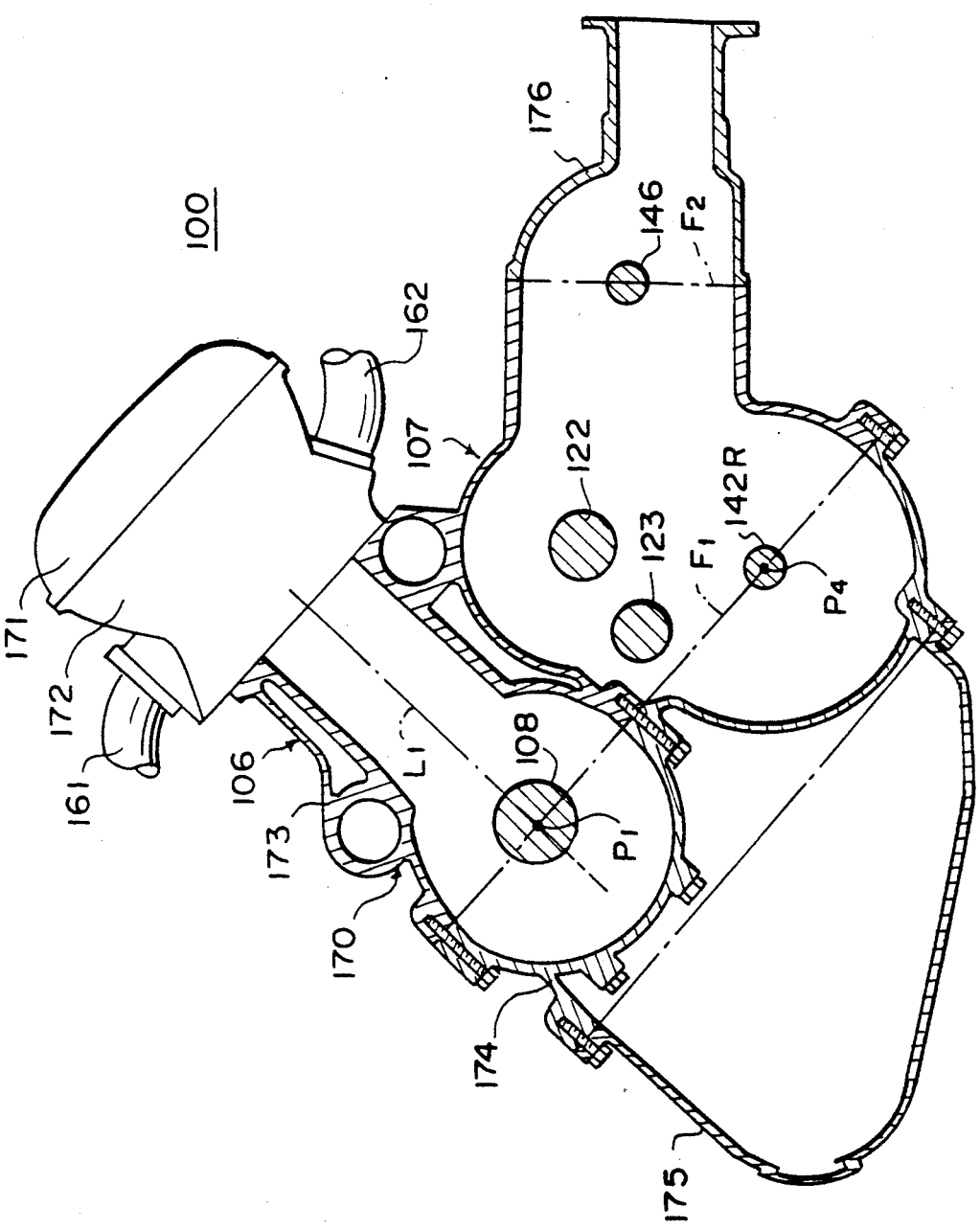
FIG. 7 is a cross-sectional view for illustrating the structure of the engine housing in the third embodiment.
Figure 8:
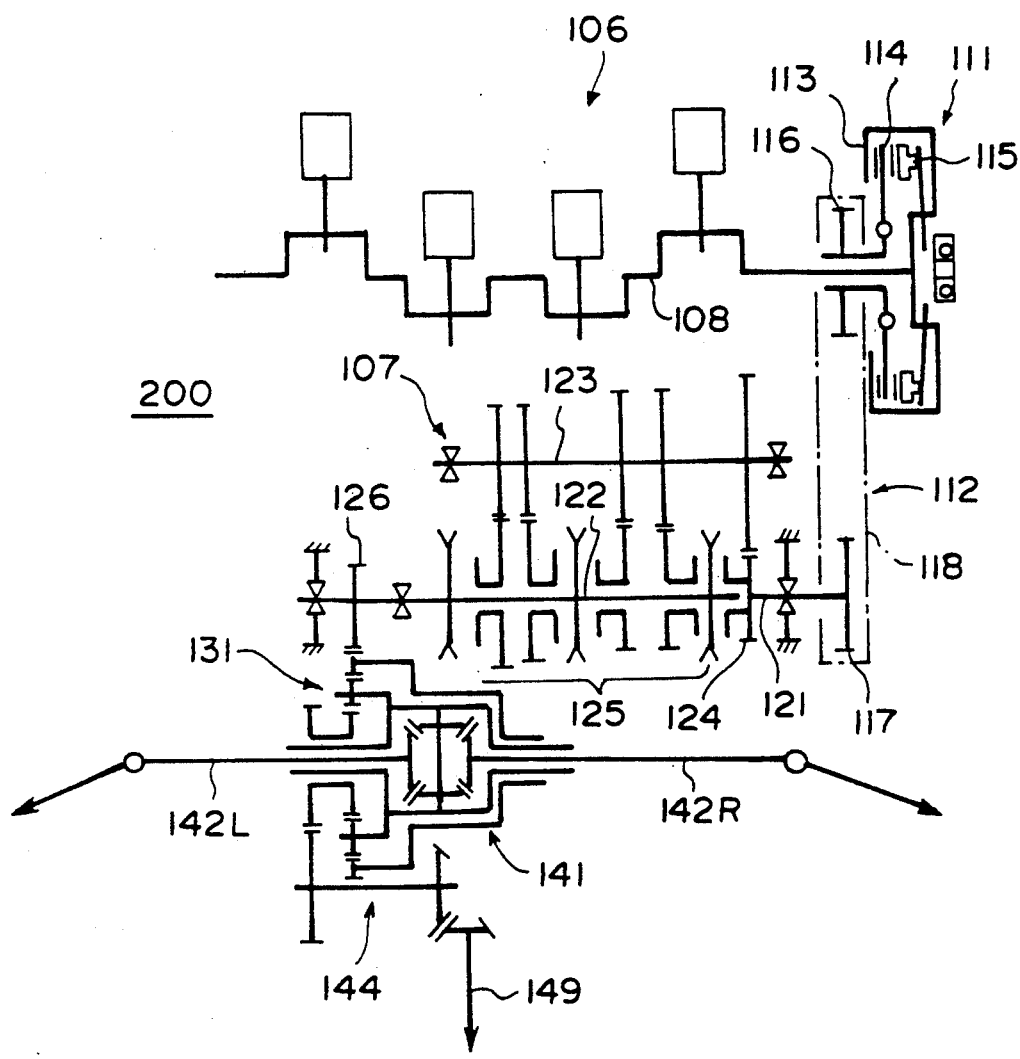
FIG. 8 is a view similar to FIG. 4 but showing a fourth embodiment of the present invention.

The engine 106, the transmission 107, the center differential 131, the front differential 141 and the power transmission gear 144 are housed in one engine housing 170. As shown in FIG. 7, the engine housing 170 comprises a cylinder head 172, an upper crank case 173, a lower crank case 174 and an oil pan 175. Reference numeral 171 denotes a head cover. The upper crank case 173 is formed integrally with the cylinder block, and is mated with the lower crank case 174 along mating surfaces F1 which pass through the central axis P1 of the crankshaft 108 and is substantially normal to the central axes L1 of the cylinders. The transmission 107 and the center differential 131 are mainly in the upper crank case 173. The front differential 141 is partly in the upper crank case 173 and partly in the lower crank case 174. The mating surface F1 pass through the central axis P4 of the front differential 141 and the drive shafts 142L and 142R. The power transmission gear 144 is partly in the upper crank use 173 and partly in a gear case 176. The mating surfaces F2 of the upper crank case 173 and the gear case 176 are in a substantially vertical plane passing through the axis P5 of the gear drive shaft 146 of the power transmission gear 144, and are above the rear end of the mating surfaces F1 of the upper and lower crank cases 173 and 174.

In the engine unit of this embodiment, the engine 106, the transmission 107, the center differential 131, the front differential 141 and the power transmission gear 144 are all housed in one engine housing and accordingly, these mechanism can be arranged close to each other, whereby the engine unit can be compactly arranged.

Further, when assembling the engine unit, by connecting the upper crank case 173 and the lower crank case 174 with the crankshaft 108 and the drive shafts 142L and 142R positioned between the mating surfaces F1 and by connecting the upper crank case 173 and the gear case 176 with the gear drive shaft 146 positioned between the mating surfaces F2, the shafts 108, 142L, 142R and 146 can be easily incorporated. At the same time, since the upper crank case is integral with the cylinder block which is very rigid, the shafts can be rigidly supported without increasing the thickness of the bearing portions. Further since the mating surfaces of the all the casings 71 to 76 are arranged not to cross each other, they can be easily connected and accordingly, assembly of the engine unit 100 in accordance with this embodiment can be facilitated.

Further, in this embodiment, the engine 106 is mounted sideways with its upper portion slanted rearward and the mating surfaces F2 of the upper crank case 173 and the gear case 176 between which the gear drive shaft 146 is supported for rotation are positioned higher than the rear end of the mating surfaces F1 of the upper and lower crank cases 173 and 174 between which the crankshaft 108 and the drive shafts 142L and 142R are supported for rotation. Accordingly, the mating surfaces F2 can be positioned in a substantially vertical planes and the upper crank case 173 and the gear case 176 can be easily connected. At the same time, the gear drive shaft 146 and the front end of the propeller shaft 145 can be supported high, and accordingly, the propeller shaft 145 can be extended linearly rearward without being it in the vertical direction, whereby power transmission loss at the propeller shaft can be reduced and vibration of the vehicle body can be suppressed.

An engine unit 200 in accordance with a fourth embodiment of the present invention which is applied to a four-wheel drive vehicle will be described with reference to FIGS. 8 to 12, hereinbelow.

The engine unit 200 of this embodiment is substantially the same as the engine unit 100 of the third embodiment in the basic structure of the engine 106, the transmission 107 and the like, but differs from it in the system for transmitting the driving force output from the transmission 107 to the front and rear wheels.

Figure 11:
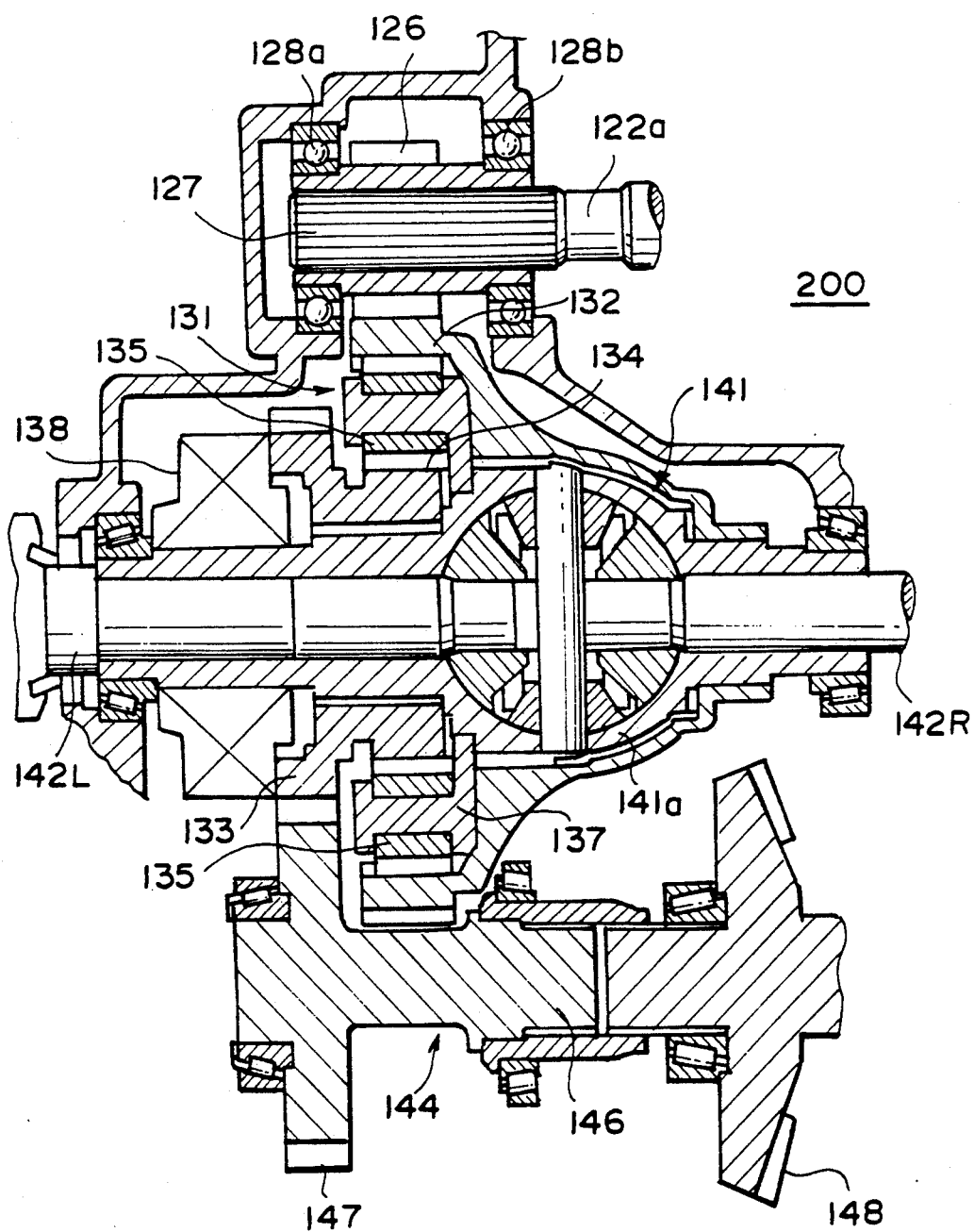
FIG. 11 is a cross-section view showing an important part of the engine unit.

That is, as clearly shown in FIG. 11, an output gear 126 is mounted on the end portion of the output shafts 122 of the transmission 107 by way of splines 127. The output gear 126 is supported for rotation by bearing 128a and 128b on opposite sides thereof. The driving force output from the output gear 126 is transmitted to the center differential 131 and then distributed to the front and rear wheels by the center differential 131. The deriving force for the front wheels is transmitted to the front differential 141 and then the front wheels 109 by way of the left and right drive shafts 142L and 142R.

The driving force for the rear wheels is transmitted to a rear differential (not shown) through the power transmission gear 144.

The center differential 131 and the front differential 141 are disposed in parallel to the drive shafts 142L and 142R which are out of alignment with the output shaft 122 of the transmission 107. The front differential 141 is positioned on the drive shafts 142L and 142R toward the transmission 107 and near the longitudinal axis of the vehicle body (in a position opposed to the bearing 128b for the output gear 126), and the center differential 131 is on the side of the front differential 141 opposite to the transmission 107. The center differential 131 is of a planetary gear type and comprises a ring gear 132 in mesh with the output gear 126, a sun gear 134 which is coaxial with the ring gear 132 and is connected to a rear wheel side output gear 133 to rotate integrally therewith, a planetary gear 135 in mesh with both the ring gear 132 and the sun gear 134, and a carrier 137 which supports the planetary gear 135 and is connected to a differential case 141a of the front differential 141 to rotate integrally therewith. The front differential 141 is of a bevel gear type, and the sun gear 134 and an output gear 133 are mounted for rotation on an end portion of the differential case 141a of the front differential 141 (the end portion remote front the transmission 107). The output gear 133 is formed integrally with the sun gear 134 and is in mesh with a gear 147 of the power transmission gear 144. A differential limiting mechanism 138 comparing a hydraulic clutch limits rotation of the output gear 133 and the differential case 141 relative to each other or rotation of the sun gear 134 and the carrier 137 relative to each other. The power transmission gear 144 comprises a gear drive shaft 146 extending in the transverse direction of the vehicle body, a gear 147 which is fixed to an end of the gear drive shaft 146 and in mesh with the output gear 133 and a pair of hypoid gears 148 which are respectively fixed to the other end of the gear drive shaft 146 and an end of a shaft 149 which is connected to the propeller shaft 145.

Figure 9:
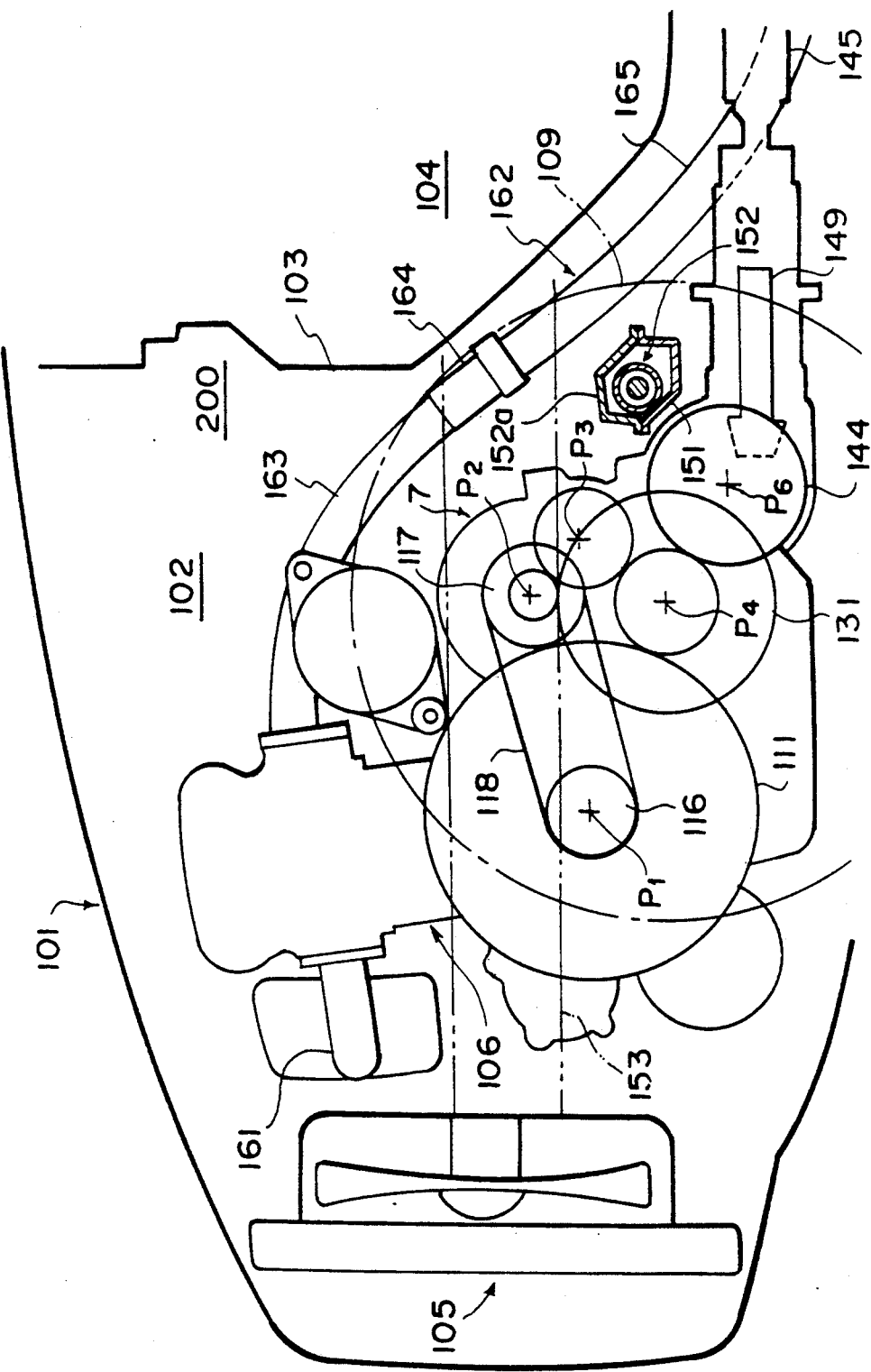
FIG. 9 is a view similar to FIG. 5 but showing a fourth embodiment of the present invention.
Figure 10:
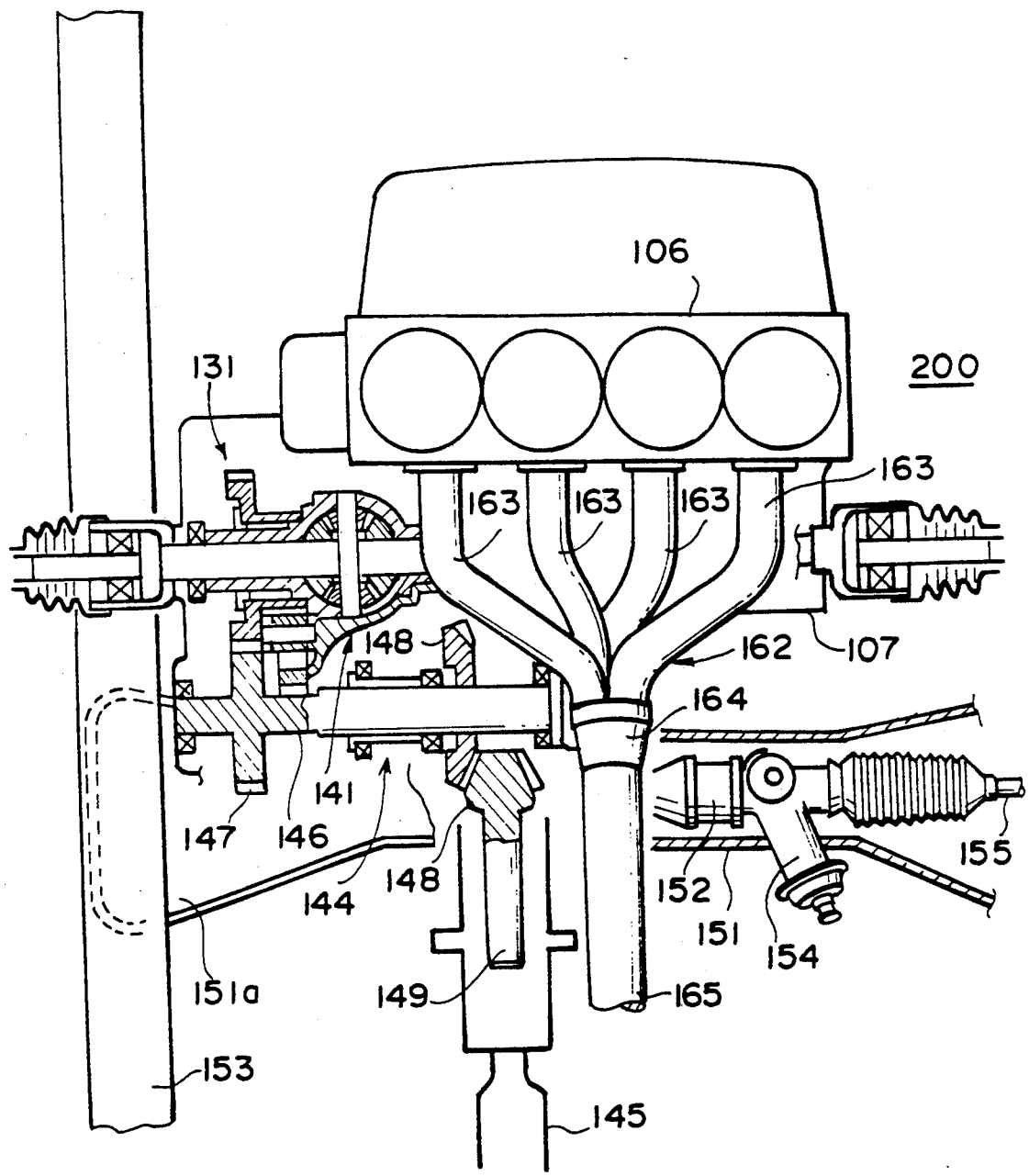
FIG. 10 is a view similar to FIG. 6 but showing a fourth embodiment of the present invention.

The arrangement of the engine 106, the transmission 107 and the like in the fourth embodiment is somewhat differs from that in the third embodiment. That is, as shown in FIG. 9, the engine 106 is mounted sideways with its upper portion slightly slanted forward of the vehicle body. The central axis P2 of the input shaft 121 and the output shaft 122 of the transmission 107 is disposed rearward of the central axis P1 of the crankshaft 108 and slightly higher than the axis P1. The central axis P3 of the countershaft 123 of the transmission 107 is disposed rearward of the axis P2 and lower than the same. The central axis P4 of the center differential 131, the front differential 141 and the drive shafts 142L and 142R is positioned substantially just below the axis P2. The central axis P6 of the power transmission gear 144 (the gear drive shaft 146) is positioned rearward of the axis P4 and below the same. The shaft 149 and the propeller shaft 145 extend rearward from a position which is slightly below the axis P6, that is, from a position near the bottom of the engine unit 200.

In this embodiment, the cross member 151 through which the steering rack 152 extends in the transverse direction of the vehicle body between the power transmission gear 144 and the exhaust pipe 162.

The structure of the engine housing of this embodiment is basically the same as that in the third embodiment.

Figure 12:
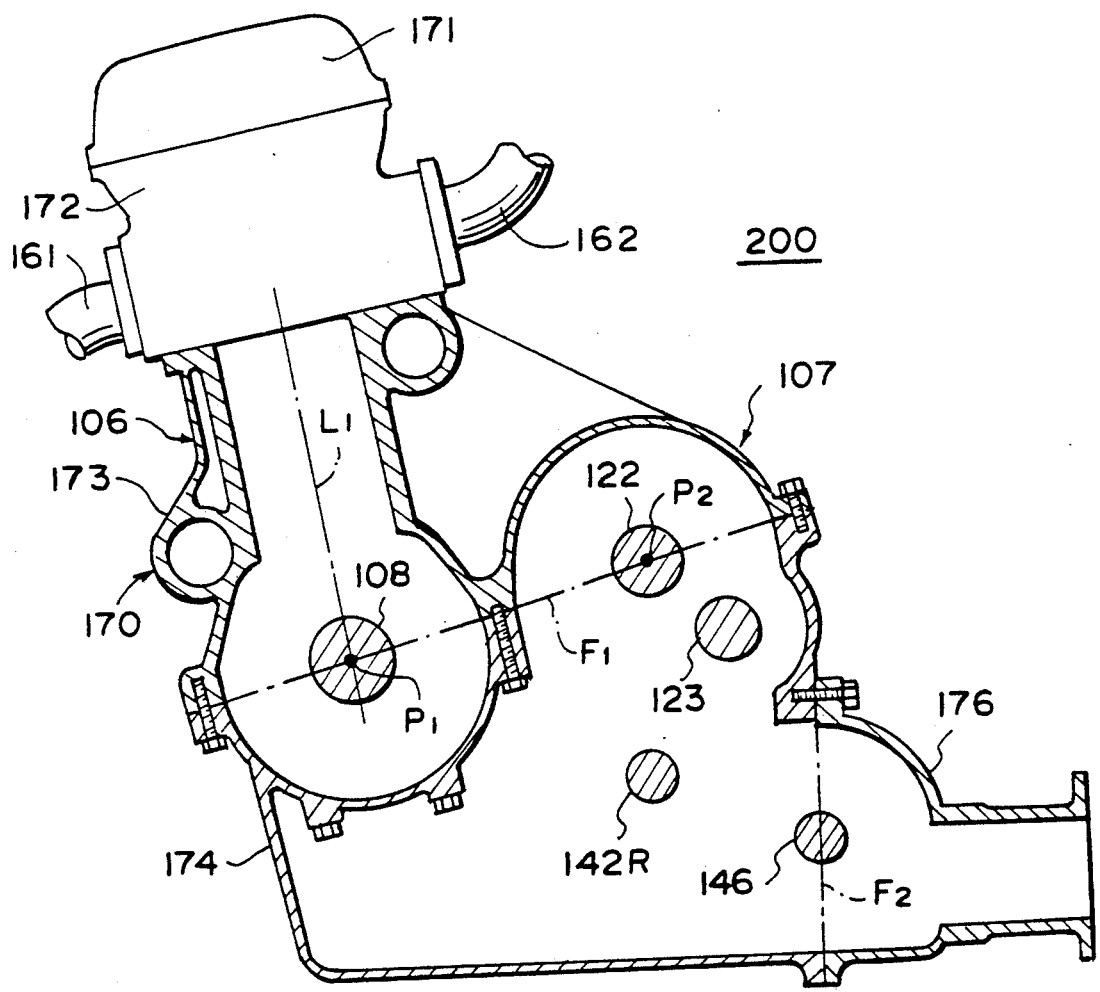
FIG. 12 is a view similar to FIG. 7 but showing a fourth embodiment of the present invention.

That is, as shown in FIG. 12, the engine housing 170 comprises a cylinder head 172, an upper crank case 173 and a lower crank case 174. An oil pan is formed integrally with the lower crank case 174. Reference numeral 171 denotes a head cover. The upper crank case 173 is formed integrally with the cylinder block, and is mated with the lower crank case 174 along mating surfaces F1 which passes through the central axis P1 of the crankshaft 108 and the central axis P2 of the input output shafts 121 and 122 of the transmission 107 and is substantially normal to the central axes L1 of the cylinders. The transmission 107 is partly in the upper crank case 173 and partly in the lower crank case 174.

The center differential 131 and the front differential 141 are mainly in the lower crank case 174. The drive shafts 142L and 142R which are in alignment with the differentials 131 and 141 extend through the lower crank case 174. The power transmission gear 144 is partly in the upper crank case 173 and partly in the gear case 176. The mating surfaces F2 of the upper crank case 173 and the gear case 176 are in a substantially vertical plane passing through the axis P5 of the gear drive shaft 146 of the power transmission gear 144, and are below the rear end of the mating surfaces F1 of the upper and lower crank cases 173 and 174.

Also in the engine unit of this embodiment, the engine 106, the transmission 107, the center differential 131, the front differential 141 and the power transmission gear 144 are all housed in one engine housing and accordingly, these mechanisms can be arranged close to each other, whereby the engine unit can be compactly arranged. At the same time, since the upper crank case is integral with the cylinder block which is very rigid, the shafts can be rigidly supported without increasing the thickness of the bearing portions. Further since the mating surfaces F1 between which the crankshaft 108 and the input and output shafts 121 and 122 of the transmission 107 are mounted for rotation and the mating surfaces F2 between which the gear drive shaft 146 of the power transmission gear 144 is supported for rotation are arranged not to cross each other, the cases can be easily connected and accordingly, assembly of the engine unit 200 in accordance with this embodiment can be facilitated.

Further, in this embodiment, the engine 106 is mounted sideways with its upper portion slanted forward and the mating surfaces F2 of the upper crank case 173 and the gear case 176 between which the gear drive shaft 146 is supported for rotation are positioned lower than the rear end of the mating surfaces F1 of the upper and lower crank cases 173 and 174 between which the crankshaft 108 and the drive shafts 142L and 142R are supported for rotation. Accordingly, the mating surfaces F2 can be positioned in a substantially vertical planes and the upper crank case 173 and the gear case 176 can be easily connected. At the same time, the power transmission gear 144 can be positioned low and lubrication of the power transmission gear 144 is facilitated.

Figure 13:
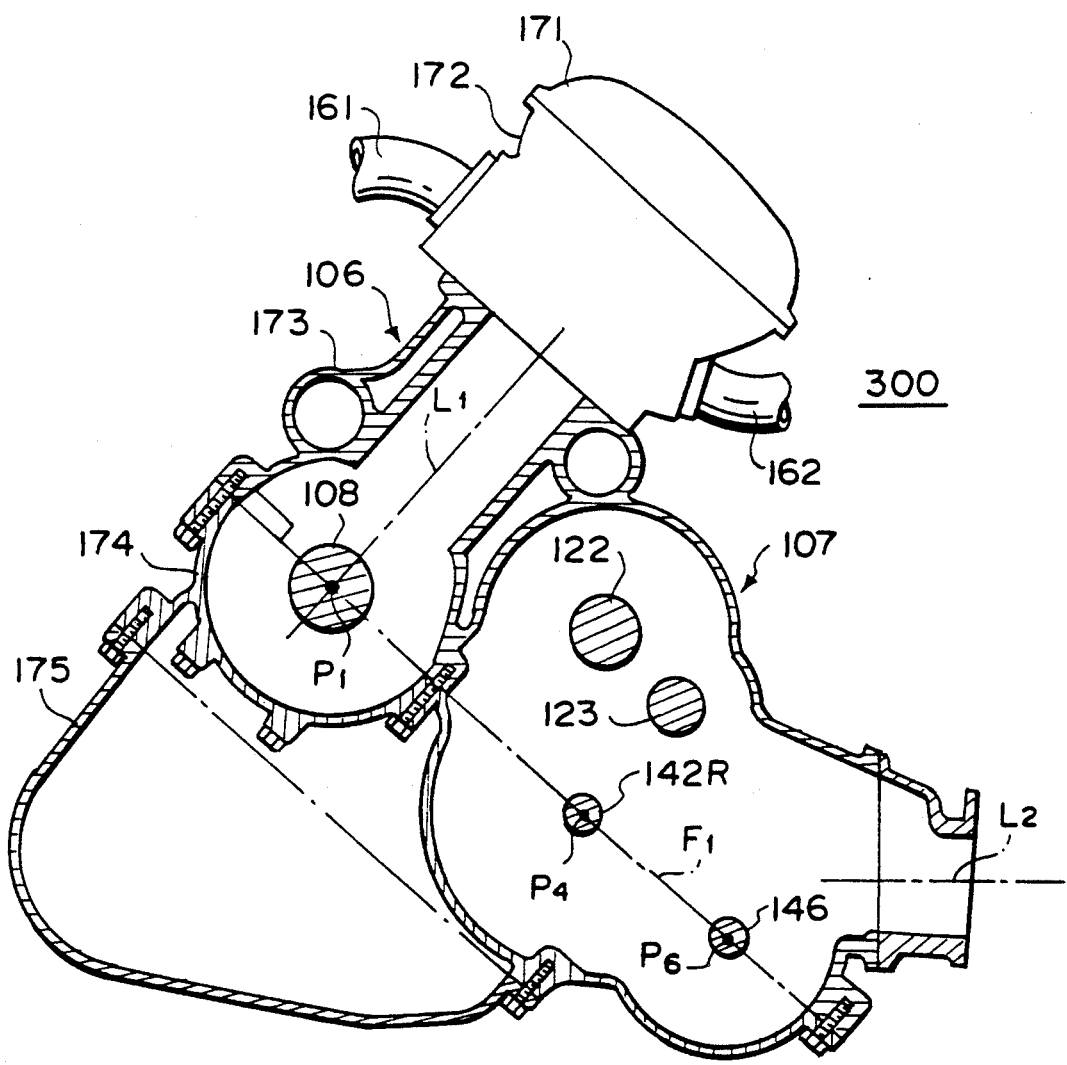
FIG. 13 is a view similar to FIG. 7 but showing a fifth embodiment of the present invention.

The engine unit 300 in accordance with a fifth embodiment of the present invention shown in FIG. 13 is substantially the same as the engine unit 200 of the fourth embodiment except that the upper portion of the engine is slanted rearward and the engine housing differs from that of the fourth embodiment.

That is, the engine housing 170 comprises a cylinder head 172, an upper crank case 173, a lower crank case 174 and an oil pan 175. Reference numeral 171 denotes a head cover. The upper crank case 173 is formed integrally with the cylinder block, and is mated with the lower crank case 174 along mating surfaces F1 which pass through the central axis P1 of the crankshaft 108, the central axis P4 of the center differential 131, the front differential 141 and the drive shafts 142L and 142R and is substantially normal to the central axes L1 of the cylinders. The mating surfaces F1 inclines downward rearward. The transmission 107 is mainly in the upper crank case 173. The center differential 131, the front differential 141 and the power transmission gear 144 are partly in the upper crank case 173 and partly in the lower crank case 174. The central axis L2 of the shaft 149 of the power transmission gear 144 or the propeller shaft 145 is offset above from the central axis P6 of the dear drive shaft 146.

Also in the engine unit of this embodiment, the engine 106, the transmission 107, the center differential 131, the front differential 141 and the power transmission gear 144 are all housed in one engine housing and accordingly, these mechanisms can be arranged close to each other, whereby the engine unit can be compactly arranged. At the same time, since the upper crank case is integral with the cylinder block which is very rigid, the shafts can be rigidly supported without increasing the thickness of the bearing portions. Further since the crankshaft 108, the drive shafts 142L and 142R and the gear drive shaft 146 are all supported for rotation between the mating surfaces F1, the number into which the engine housing is divided in order to facilitate incorporation of the rotational shafts is reduced, whereby assembly of the engine unit is facilitated and the edge unit can be produced at low cost.

Further, when the axis L2 of the propeller shaft 145 is positioned higher than the axis P6 of the gear drive shaft 146, the propeller shaft 145 can be extended linearly rearward without bending it in the vertical direction in order to ensure a sufficient road clearance, whereby power transmission loss at the propeller shaft can be reduced and vibration of the vehicle body can be suppressed.

Though, in the third to fifth embodiments, the present invention is applied to the four-wheel drive vehicle having a center differential, the present invention can be applied also to the four-wheel drive vehicle without such a center differential.

What is claimed is:

1. An engine unit comprising an engine having a cylinder block and a crankshaft and a power train including a transmission having a transmission shaft and a differential having differential shaft, the engine and the power train being housed in parallel to each other in one engine housing formed of upper and lower parts which are mated with each other along respective mated surfaces, characterized in that upper halves of bearings for the crankshaft and upper halves of bearings for one of the transmission shaft and the differential shaft are formed in the mating surface of the upper part of the engine housing, and lower halves of bearing for the crankshaft and lower halves of bearings for said one of the transmission shaft and the differential shaft are formed in the mating surface of the lower part of the engine housing, the upper part of the engine housing being formed integrally with the cylinder block of the engine.

2. An engine unit as defined in claim 1 in which said engine is mounted sideways with the crankshaft extending transverse direction of the vehicle body and with its upper portion slanted rearward, and said mating surfaces are inclined rearward downward.

3. An engine unit as defined in claim 1 in which said one of the transmission shaft and the differential shaft is the differential shaft.

4. An engine unit as defined in claim 1 in which bearings for a balancer shaft are formed in the mating surfaces.

5. An engine unit as defined in claim 1 in which said differential shaft is connected to the front wheels of the vehicle to drive them and which further comprises a power transmission gear for transmitting the output of the transmission to an propeller shaft which drives the rear wheels of the vehicle, said engine being mounted sideways on the vehicle body with its crankshaft extending in the transverse direction of the vehicle body, the transmission being disposed rearward of the engine in parallel thereto, the central axis of the differential shaft being disposed rearward of the crankshaft, said power transmission gear having a gear drive shaft which extends in the transverse direction of the vehicle body on the rear side of the central axis of the differential shaft, the bearings of the gear drive shaft being formed in said mating surfaces.

6. An engine unit as defined in claim 5 in which the upper part of said engine is slanted rearward, and the central axis of the propeller shaft is offset upward from the central axis of the gear drive shaft.

7. An engine unit as defined in claim 6 in which a center differential which permits the front and rear wheels to rotate at different speeds is provided on said differential shaft.

8. An engine unit as defined in claim 1 in which said mating surfaces are substantially normal to the axes of the cylinders of the engine.

9. An engine unit as defined in claim 1 in which said differential shaft is connected to the front wheels of the vehicle to drive them and which further comprises a power transmission gear for transmitting the output of the transmission to an propeller shaft which drives the rear wheels of the vehicle, said engine being mounted sideways on the vehicle body with its crankshaft extending in the transverse direction of the vehicle body, the transmission being disposed rearward of the engine in parallel thereto, the central axis of the differential shaft being disposed rearward of the crankshaft, said power transmission gear having a gear drive shaft which extends in the transverse direction of the vehicle body on the rear side of the central axis of the differential shaft, said engine housing having a third part which is mated with one of the upper and lower parts of the engine housing along second mating surfaces, and the bearings for the gear drive shaft being formed in said second mating surfaces.

10. An engine unit as defined in claim 9 in which said engine mounted with its upper portion slanted rearward, and said second mating surfaces are positioned higher than the rear end of the mating surfaces in which the bearings for the crankshaft are formed.

11. An engine unit as defined in claim 10 in which a center differential which permits the front and rear wheels to rotate at different speeds is provided coaxially with the transmission shaft.

12. An engine unit as defined in claim 9 in which said engine mounted with its upper portion slanted forward, and said second mating surfaces are positioned lower than the rear end of the mating surfaces in which the bearings for the crankshaft are formed.

13. An engine unit as defined in claim 12 in which a center differential which permits the front and rear wheels to rotate at different speeds is provided on said differential shaft.

* * * * *